(12) United States Patent
Atsatt

(10) Patent No.: US 8,661,379 B1
(45) Date of Patent: Feb. 25, 2014

(54) TECHNIQUES AND APPARATUS TO VALIDATE AN INTEGRATED CIRCUIT DESIGN

(71) Applicant: Altera Corporation, San Jose, CA (US)

(72) Inventor: Sean R. Atsatt, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/803,595

(22) Filed: Mar. 14, 2013

Related U.S. Application Data

(62) Division of application No. 13/194,916, filed on Jul. 30, 2011, now Pat. No. 8,407,643.

(51) Int. Cl.
*G06F 9/45* (2006.01)

(52) U.S. Cl.
USPC .......................................... 716/103

(58) Field of Classification Search
USPC ........................................... 716/103
See application file for complete search history.

(56) References Cited

U.S. PATENT DOCUMENTS

| 7,827,510 B1 * | 11/2010 | Schubert et al. | 716/136 |
| 8,065,640 B1 * | 11/2011 | Richter et al. | 716/104 |
| 2012/0117436 A1 * | 5/2012 | Portolan et al. | 714/738 |

* cited by examiner

*Primary Examiner* — Suresh Memula
(74) *Attorney, Agent, or Firm* — Womble Carlyle Sandridge & Rice LLP

(57) ABSTRACT

Techniques for generating an integrated circuit (IC) design configuration file are provided. The techniques include compiling a design file to generate a compiled IC design. The design file may include multiple constraints that are associated with the design. Status reports are generated based on the compiled IC design and the associated constraints. At least a portion of the generated status reports is encoded. A configuration that includes the encoded portion of the status reports is generated based on the compiled IC design is generated.

20 Claims, 8 Drawing Sheets

TECHNIQUES AND APPARATUS TO VALIDATE AN INTEGRATED CIRCUIT DESIGN

PRIORITY

This application is a divisional application of U.S. patent application Ser. No. 13/194,916 filed Jul. 30, 2011, which is herein incorporated by reference in its entirety for all purposes.

BACKGROUND

Programmable logic devices (PLDs) such as field-programmable gate arrays (FPGAs) and application-specific integrated circuits (ASICs) are integrated circuits (ICs) devices that include generic structures and logic blocks that can be configured to perform different functions. Some of these logic blocks include logic circuitry, registers, I/O blocks, memory blocks, digital signal processing (DSP) blocks, various configurable blocks, etc. These circuitry elements are programmable to perform any of a variety of tasks and functions.

A user may design an application on an IC device and configure the IC device to perform certain tasks and functions. Generally speaking, the user may use a software design tool, e.g., the assignee's QUARTUS® II software, to compile the circuit design to generate a configuration file that can be used to configure the actual IC device. Compiling the circuit design involves taking a design description, usually written in a hardware description language (HDL), synthesizing the design description to generate a netlist description of the design, placing and routing the design on a selected IC device, performing timing analysis, checking the design for design rule violations, etc. Generally speaking, the software design tool will perform any of a variety of these steps to generate a bitstream configuration file.

After the design is compiled, i.e., modeled and simulated, the actual IC device is configured with the design using the generated configuration file. Even though the compiled design is relatively free from errors, there are instances when the design will still fail during runtime if the circuit design did not follow specific design rules or timing processes. For instance, a circuit design that violates certain design rules may still be compiled even if the circuit designer chose to ignore those violations. However, when the design is implemented on the actual IC device, the affected blocks may fail during operation of the IC device.

Under these circumstances, it is difficult for the user tell if the failure is a hardware failure or a design failure. This makes it relatively harder to pinpoint the cause of the failure when there is no apparent hardware defect.

SUMMARY

It is desirable to have a mechanism or a technique to store the status of timing and design rule check (DRC) coverage of the circuit design on the actual device. It is also desirable to make this information easily accessible to allow the user to validate the circuit design placed on the IC device. Exemplary embodiments include techniques for configuring an integrated circuit (IC) and validating a circuit design placed on the IC.

It should be appreciated that the exemplary embodiments can be implemented in numerous ways, such as a process an apparatus, a system, a device or a method on a computer readable medium. Several embodiments are described below.

In one embodiment, a method of generating an IC design configuration file is disclosed. The method includes compiling a design file and a plurality of constraints to generate a compiled IC design. A plurality of status reports is generated based on the compiled IC design and the plurality of constraints associated with the IC design during the compilation of the design file. At least a portion of the plurality of status reports that are generated during compilation of the design file is encoded. A configuration file that includes the portion of the encoded plurality of status reports is generated based on the compiled IC design.

In another embodiment, a machine-readable storage medium encoded with sequences of instructions for compiling an IC design is disclosed. The machine-readable medium has instructions for analyzing the IC design based on a plurality of constraints associated with the IC design. A design rule check operation is performed on the IC design based on a plurality of predefined rules. A plurality of status reports is then generated based on the analyzing and design rule check operations. A configuration file is then generated based on the IC design. At least a portion of the plurality of status reports is encoded and recorded in the configuration file.

In yet another embodiment, a method of storing design information in an IC is disclosed. The method includes compiling an IC design to generate status information related to the IC design. The status information generated from the compilation operation is then encoded. A configuration file is generated based on the compiled IC design is generated. The encoded status information is included in the configuration file and the IC is configured with the configuration file. The encoded status information is stored in the IC during the configuration of the IC.

In yet another embodiment, a system for debugging a design configured on an IC is provided. The system includes an IC with a storage module. The storage module stores status information of the design that is configured on the IC. An interpreter layer is coupled to the IC. A display module is coupled to the interpreter layer. In one embodiment, the interpreter layer is a communication interface that links the IC to the display module. The design configured on the IC is accessible through the display module and the IC is capable of reporting the status information of the design configured on the IC through the interpreter layer and the display module to a user.

Other aspects will become apparent from the following detailed description, taken in conjunction with the accompanying drawings, illustrating by way of example the principles of the exemplary embodiments.

BRIEF DESCRIPTION OF THE DRAWINGS

The exemplary embodiments may best be understood by reference to the following description taken in conjunction with the accompanying drawings.

DETAILED DESCRIPTION

The following embodiments describe techniques for configuring an integrated circuit (IC) with a circuit design and validating the circuit design placed on the IC.

It will be obvious, however, to one skilled in the art, that the present embodiments may be practiced without some or all of these specific details. In other instances, well-known operations have not been described in detail in order not to unnecessarily obscure the present embodiments.

The embodiments described herein provide techniques for a user to validate timing and design rule check (DRC) statuses, among others, of a configured device, e.g., a programmable device, etc. For instance, when the device is not functioning as expected, the user may want to debug the design for possible errors. However, there is no easy technique to debug a circuit design that has already been configured on an actual device. Compilation information, e.g., timing statuses and design warnings generated during compilation, is generally not stored on the actual device.

One of the embodiments described herein includes a method to encode the status of timing and DRC coverage that are generated when the circuit design is being compiled into the configuration file that is used to configure the actual device. The encoded information can be stored on the device, allowing easy access to the user at runtime. This allows the user to detect possible design errors and make the necessary changes to the design to correct these errors, thereby avoiding unnecessary debugging of the actual device.

Figure 1:
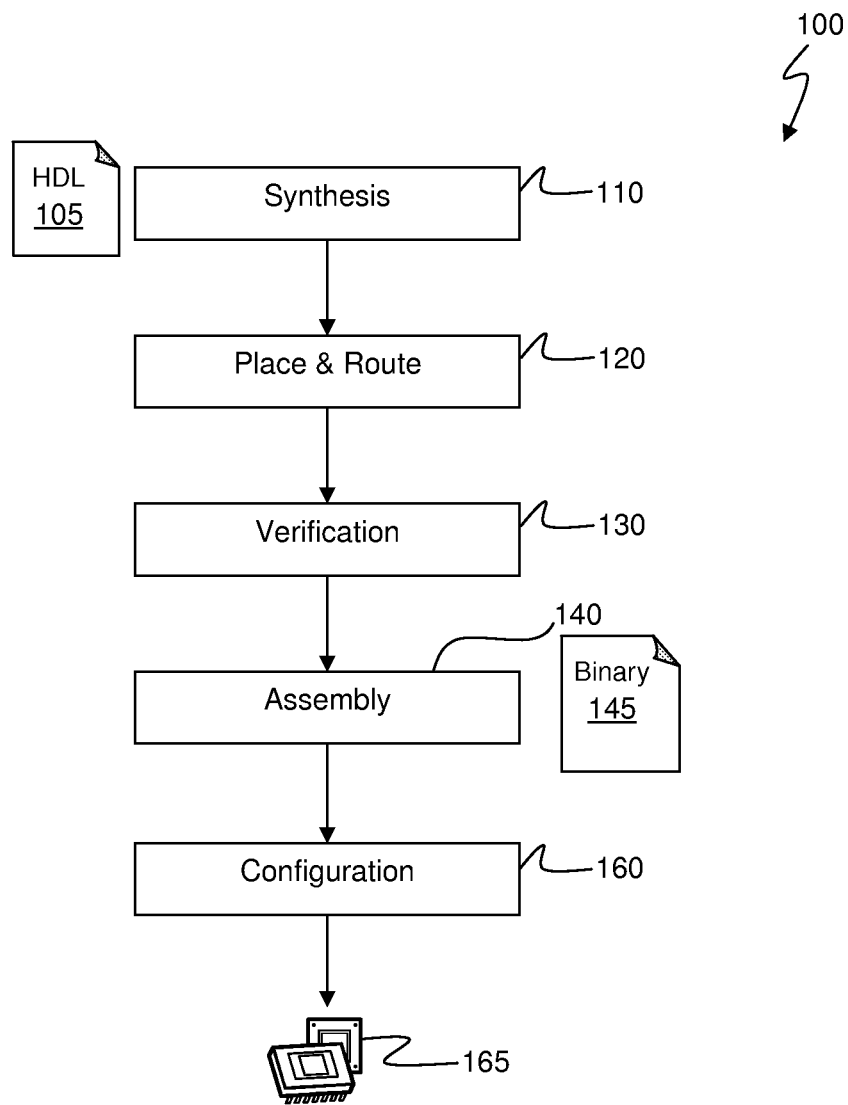
FIG. 1, meant to be illustrative and not limiting, shows a compilation flow to create a compiled design for an integrated circuit (IC) using an electronic design automation (EDA) tool, according to one embodiment.

FIG. 1, meant to be illustrative and not limiting, shows compilation flow 100 to create a compiled design for an IC using an electronic design automation (EDA) tool, according to one embodiment. The flow starts with an IC design created by a circuit developer or a hardware engineer that is embodied in a hardware description language (HDL) file 105. The IC design embodied in the HDL file is synthesized and translated into a discrete netlist of logic-gate primitives during synthesis operation 110. The synthesized logic gates and other components in the IC design are placed on the IC device during place and route operation 120. Wires are also added to connect the logic gates and all the other components in the IC to route signals in the IC design during place and route operation 120.

Referring still to FIG. 1, after place and route operation 120, verification operation 130 is performed. It should be appreciated that verification operation 130 includes, among others, timing analysis, design rule checking, simulation, etc. In one embodiment, a timing analysis operation that assigns delays to the different logic gates and wires or routes in the circuit is performed as part of verification operation 130. The timing analysis operation may also compute the lengths of different paths in the IC design and the timing constraints of the IC design. In another embodiment, a DRC operation is performed to analyze the post-synthesis netlist as part of verification operation 130. The DRC operation generates warning messages when the design does not follow a predetermined design rule and generates relevant messages to provide information regarding the rule, according to one embodiment.

Continuing from FIG. 1, binary configuration file 145 is created during assembly operation 140. In one embodiment, binary configuration file 145 contains a description of the circuit of the IC design and is used to configure IC device 165 with the IC design during configuration operation 160. In another embodiment, binary configuration file 145 also contains warning messages generated from a DRC operation that was performed as part of verification operation 130. One skilled in the art should appreciate that some operations shown in flow 100 may be optional. In other words, certain operations may be skipped if desired without stopping the EDA tool from reaching a solution.

Figure 2:
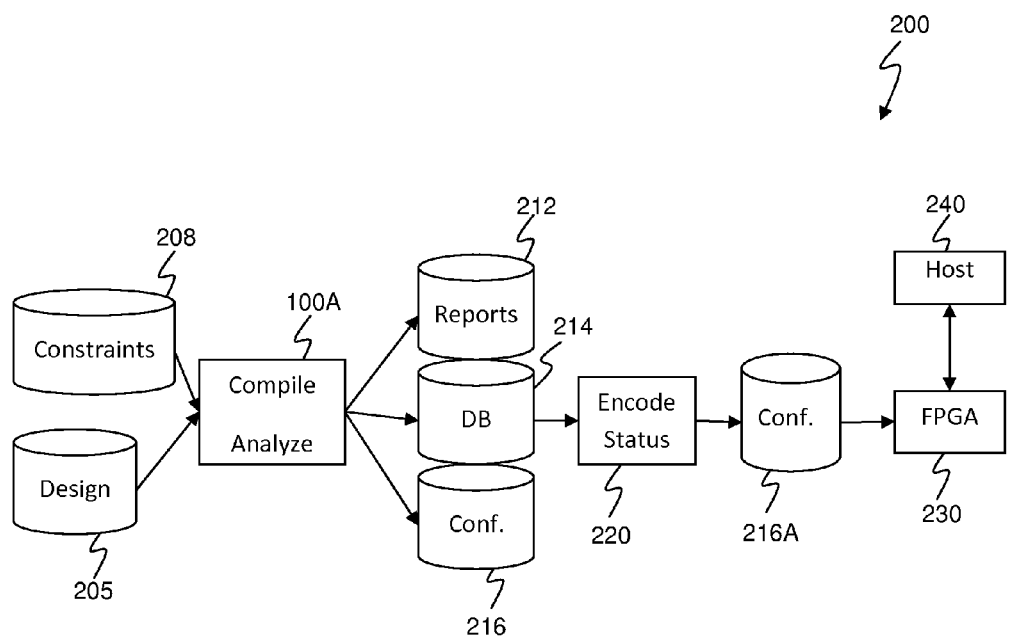
FIG. 2, meant to be illustrative and not limiting, shows a process flow for compiling an IC design for a particular IC device and encoding status information in the generated configuration file as one embodiment.

FIG. 2, meant to be illustrative and not limiting, shows process flow 200 for compiling an IC design for a particular IC device and encoding status information in the generated configuration file as one embodiment. Circuit design 205, and the constraints 208 associated with the design, is compiled and analyzed in operation 100A. Compile operation 100A executed similar functionality as compilation flow 100 as shown in FIG. 1. After compilation, reports 212, database 214 and configuration file 216 are generated.

Referring still to FIG. 2, reports 212 may include a variety of timing reports, power analysis reports, etc., according to one embodiment. In another embodiment, compile operation 100A includes a DRC operation that analyzes the netlist of the circuit design and generates a report according to the total number of violations of a set of predetermined rules, some of which might affect the reliability of the design. For instance, the DRC operation may group each of the different violations, depending on the severity of the violation, into different categories and generate a report that includes a total number of "critical violations", "high violations", "medium violations", etc. The DRC operation may also generate reports with detailed information about the rule violations including the name of the violated rule, the name of the particular node in the netlist, etc. As yet another example, the DRC operation may also generate reports that include status information messages, and warning and error messages that are generated according to conditions observed during the DRC operation.

Continuing from FIG. 2, status information messages that are gathered from reports 212 and compilation database 214 is encoded in operation 220. It should be appreciated that database 214 is a project database that is created by the design software tool based on circuit design 205 and includes netlists, binary files, and other design files that are generated during compilation 100A. Generally, a binary configuration file 216 is also generated as part of compilation flow 100A. Binary configuration file 216 is used to configure circuit design 205 on an actual device. Binary configuration file 216 is updated with the encoded status information to generate configuration file 216A, an updated version of configuration file 216 containing the encoded status information. In one embodiment, encode operation 220 includes writing a zero if the compiled IC design passes all the DRC operation and writing a total number of the different types of design rule violations if the compiled IC design fails the DRC operation or violates any design rules. In one embodiment, the number of the total design rule violations is grouped according to the type of design violations. One skilled in the art will appreciate that alternative classification techniques may be applied to achieve the desired functionality described above.

Table 1 below shows an exemplary encoding format with the number of bits required for each encoded status. In the illustrative embodiment of Table 1, a version number is included as part of the encoded bitstream. For instance, the version of the software used to compile the IC design is provided for backward compatibility requirements. Different types of DRC that failed during the compilation process are grouped accordingly. In one embodiment, the different types of violations are ordered using the total number for each type of violation. For instance, the type of violation with the highest number of violations is recorded first so that potentially critical violations can be resolved first. In the exemplary embodiment shown in Table 1, the total number of each type of violation is recoded as a function of the common logarithmic function, i.e., $\log_{10}$. This allows zeros to be used as separators to separate each type of violation and the number of violations can be encoded using fewer bits. In one embodiment, a value of 00 indicates that the IC design passed the DRC operation and did not violate any design rule.

TABLE 1

| # Bits | Contents |
| --- | --- |
| 8 | Version Number |
| 8 | Number of DRC Types |
| 3 | INT(Log10(DRC1:Group1) |
| 3 | INT(Log10(DRC1:Group2) |
| 3N | Additional Type 1 Groups |
| 1 | DRC Type separator |
| 3 | INT(Log10(DRC2:Group1) |
| 3 | INT(Log10(DRC2:Group2) |
| 3N | Additional Type 1 Groups |
| 1 | DRC type Separator |
| ... | Arbitrary number of DRC |
| 1 | DRC separator |

Referring still to FIG. 2, configuration file 216A may be used to configure a PLD, e.g., a PLD such as a field programmable gate array (FPGA) device, in operation 230. In one embodiment, the encoded status information in configuration file 216A is stored in a memory module on the PLD during the configuration process. After configuration, the PLD can be coupled to communicate with a host system 240, e.g., a computing device or any other user interface. In one embodiment, circuit design 205 placed on the PLD can be validated by host system 240 based on the encoded status information stored on the PLD.

Figure 3:
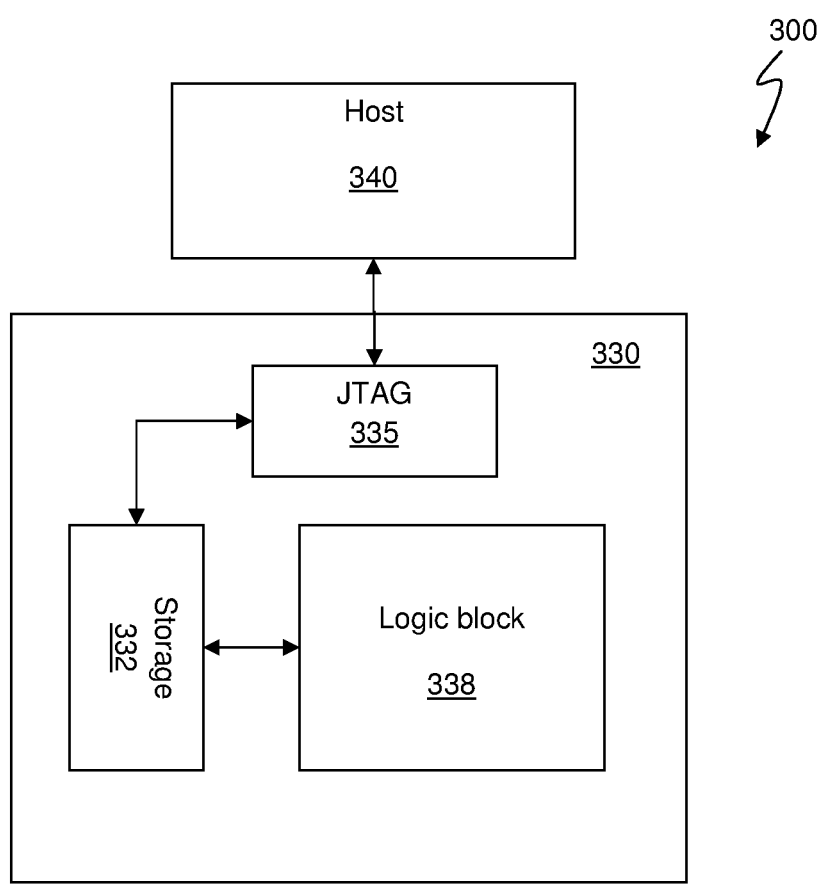
FIG. 3, meant to be illustrative and not limiting, shows a system that stores validation information for a circuit design as one embodiment.

FIG. 3, meant to be illustrative and not limiting, shows system 300 that stores validation information for a circuit design as one embodiment. IC device 330 includes JTAG interface 335 and logic block 338. Logic block 338 is configured to perform any of a variety of functions based on the circuit design that is implemented on IC device 330. It should be appreciated that not every block on an IC device is shown in the embodiment of FIG. 3 in order to not obscure details of the embodiments. In one embodiment, logic block 338 is the core logic region of IC device 330 that may be populated with logic cells which include, among other things, at the most basic level, "logic elements" (LEs) that can be configured to perform logical functions according to the compiled circuit design that is configured on the IC device.

Referring still to FIG. 3, IC device 330 includes storage block 332 for storing status information of the circuit design configured on IC device 330. As illustrated in the embodiment of FIG. 2, status information, e.g., timing status, DRC reports, etc., is encoded in configuration file 216A and the encoded information is stored in the IC when the IC device is configured with configuration file 216A. Some of the items that are encoded in the configuration file prior to the configuring of the IC device include, clock constraints, pin constraints, pin assignment status and critical design warning count, etc., according to one embodiment. The encoded status information stored in storage block 332 is used to validate the configuration of logic block 338 and the overall configuration of IC device 330. In the embodiment of FIG. 3, configured IC device 330 is accessible from host 340 through Joint Action Test Group (JTAG) interface 335. Host 340 is capable of reading the information stored in storage block 332 from IC device 330 and parsing or decoding the information from IC device 330 and reporting the information back to a user.

Referring still to FIG. 3, host 340 may be a computer system coupled to IC device 330 through JTAG interface 335 with a monitor capable of displaying relevant information read from IC device 330 to a user. The computer system may include an interpreter layer or an interface, e.g., a software application that is able to decode the information read from IC device 330 and display the decoded information on a monitor or display module. In one embodiment, host 340 is a computer system similar to computer system 800 of FIG. 8 as described below. It should be appreciated that even though JTAG interface 335 is shown, status information stored in storage block 332 of IC device 330 may be accessible through an output port and other communication channels on the IC device, e.g., peripheral component interconnect (PCI), peripheral component interconnect express (PCIE), etc.

Figure 4:
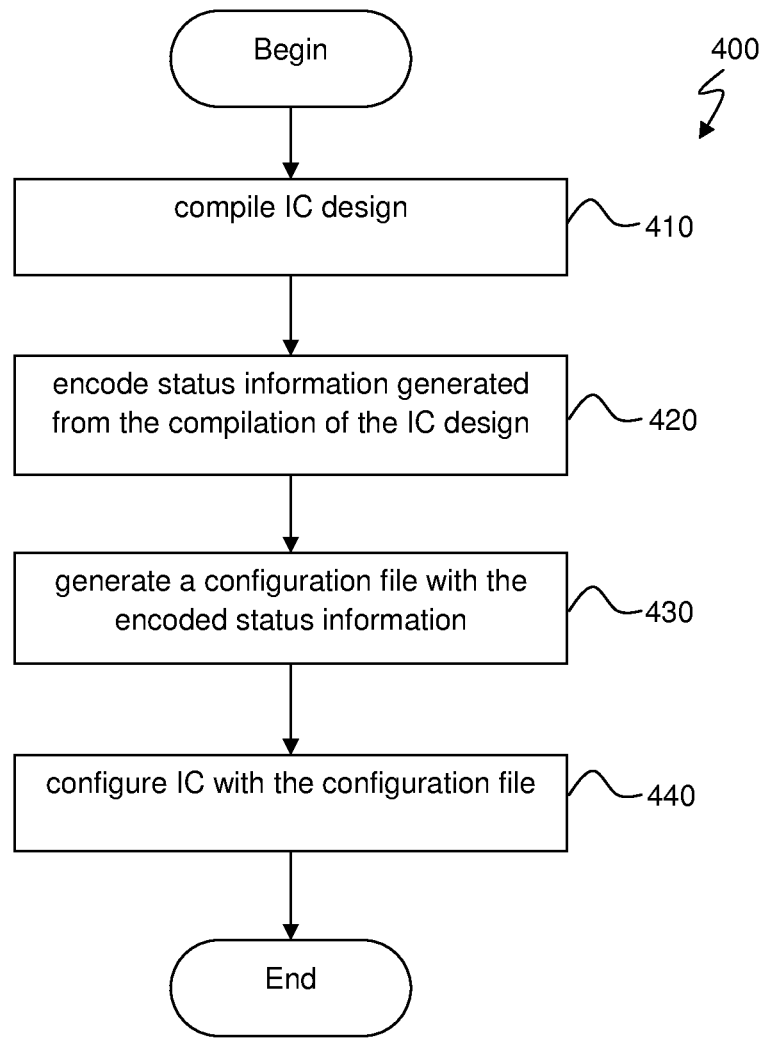
FIG. 4, meant to be illustrative and not limiting, shows a process flow for storing information in an IC as one embodiment.

FIG. 4, meant to be illustrative and not limiting, shows process flow 400 for storing information in an IC as one embodiment. Flow 400 begins by compiling an IC design in operation 410. In one embodiment, the compile operation is similar to compilation flow 100 of FIG. 1 and includes multiple analysis operations performed on the IC design. Status information, e.g., timing analysis information, DRC status messages, etc., that are related to the IC design is generated during compilation process 410. The status information is then encoded in operation 420. Encoding the status information allows the status information to be stored in a fewer number of bits, according to one embodiment.

Continuing from FIG. 4, a configuration file that contains the encoded status information is generated in operation 430 based on the compiled IC design. The configuration file is used to configure the IC in operation 440. The encoded status information is stored in the IC during the configuration of the IC. In one embodiment, the encoded status information is stored in a dedicated storage element on the IC so that the encoded status information can be easily retrieved from the IC as needed. In the embodiment of FIG. 3, the encoded status information is stored in storage block 332 and the stored status information is accessible during runtime through JTAG interface 335. It should be appreciated that the stored status information may include a variety of messages that are generated during the compilation of the IC design. These include, among others, pin assignment status, pin timing constraints status, clock timing constraints, etc. Storing this information on the configured IC allows the IC to be checked or debugged during runtime. In one embodiment, the encoded status information is decoded and read from the IC during runtime.

Figure 5:
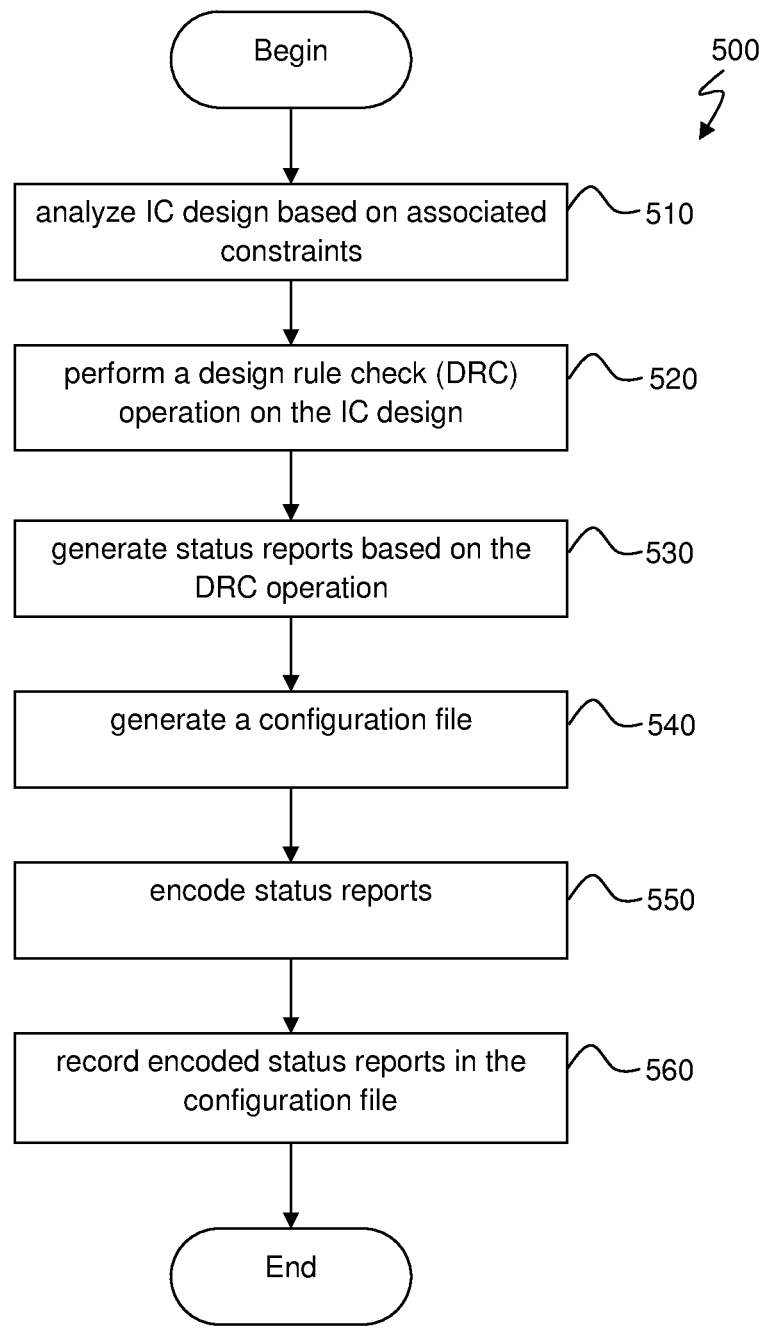
FIG. 5, meant to be illustrative and not limiting, shows a process flow for compiling an IC design as one embodiment.

FIG. 5, meant to be illustrative and not limiting, shows process flow 500 for compiling an IC design as one embodiment. Process flow 500 begins by analyzing an IC design based on the constraints associated with the IC design in operation 510. In one embodiment, the IC design is analyzed by performing a timing analysis operation on the IC design and generating a timing report based on the timing analysis. A DRC operation is performed on the IC design in operation 520. In one embodiment, the DRC operation includes at least a pin assignment status check, a pin timing constraints check or a clock timing constraints check.

Continuing from FIG. 5, multiple status reports are generated in operation 530 based on the earlier operations. For instance, different types of warning messages may be generated by the DRC operation based on the IC design and the severity of the rules that are violated by the IC design. A configuration file is generated based on the IC design in operation 540. The generated status reports are encoded in operation 550. It should be appreciated that encoding the generated status reports may include encrypting the status reports, compressing the status reports or a combination of both methods. For instance, the information in the status reports may be mathematically processed such that the total number of bits that are needed to store the information is reduced. According to one embodiment, the generated status reports are encoded based on the exemplary format shown in Table 1. The encoded status reports are then recorded in the configuration file in operation 560. In an exemplary embodiment, the configuration file is used to configure a programmable logic device (PLD) and the encoded status reports are recorded in the PLD as part of its configuration. The status reports are then accessible through the PLD during runtime.

Figure 6:
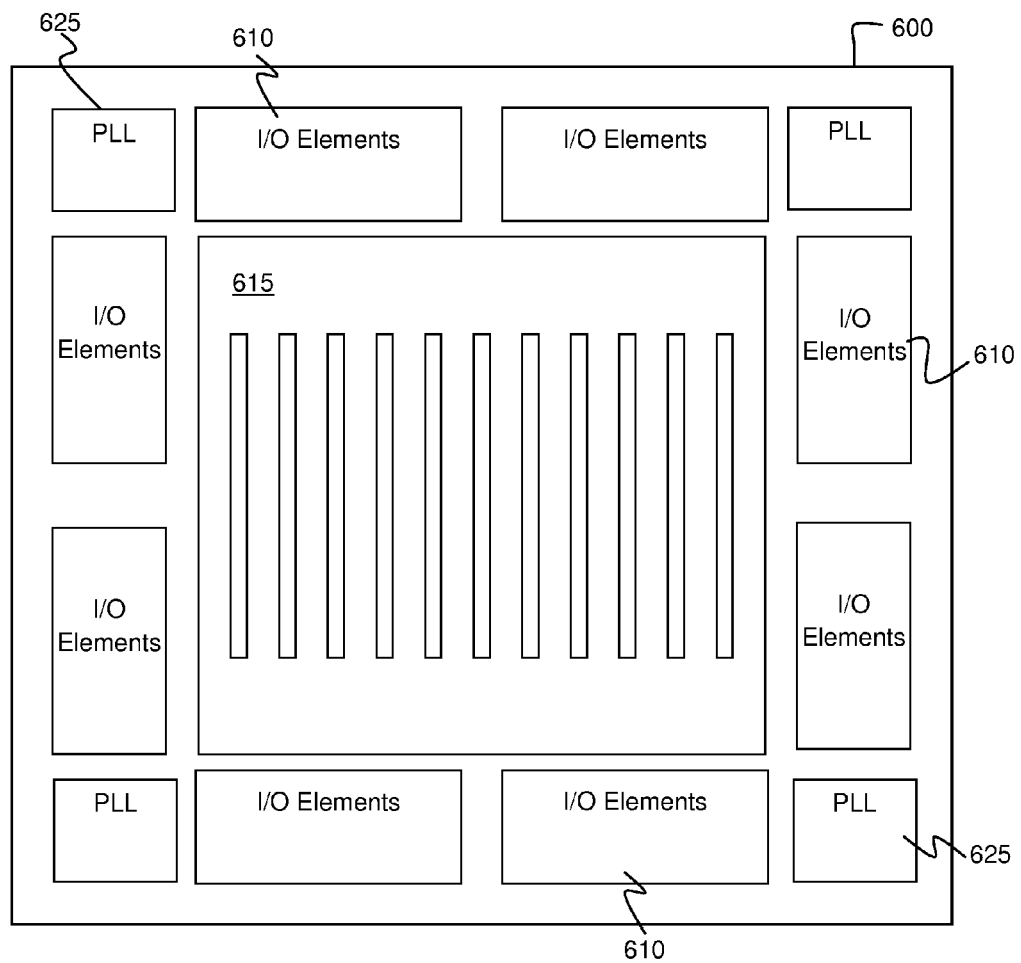
FIG. 6, meant to be illustrative and not limiting, shows a block diagram of a programmable logic device (PLD) that can include aspects of the present exemplary embodiments.

FIG. 6, meant to be illustrative and not limiting, shows a simplified block diagram of PLD 600 that can include aspects of the present exemplary embodiments. Programmable device 600 includes logic region 615 and I/O elements 610. I/O elements 610 may support a variety of memory interfaces. Other auxiliary circuits such as phase-locked loops (PLLs) 625 for clock generation and timing, can be located outside the core logic region 615, e.g., at corners of programmable device 600 and adjacent to I/O elements 610. Logic region 615 may be populated with logic cells which include, among other things, at the most basic level, "logic elements" (LEs). LEs may include look-up table-based logic regions and these logic elements may be grouped into "Logic Array Blocks" (LABs). The logic elements and groups of logic elements or LABs can be configured to perform logical functions desired by the user. Logic region 615 may also include logic circuitry and storage blocks that can be used to store encoded status messages so that these messages are accessible during runtime. In one embodiment, this allows the design configured on the PLD to be easily validated.

Figure 7:
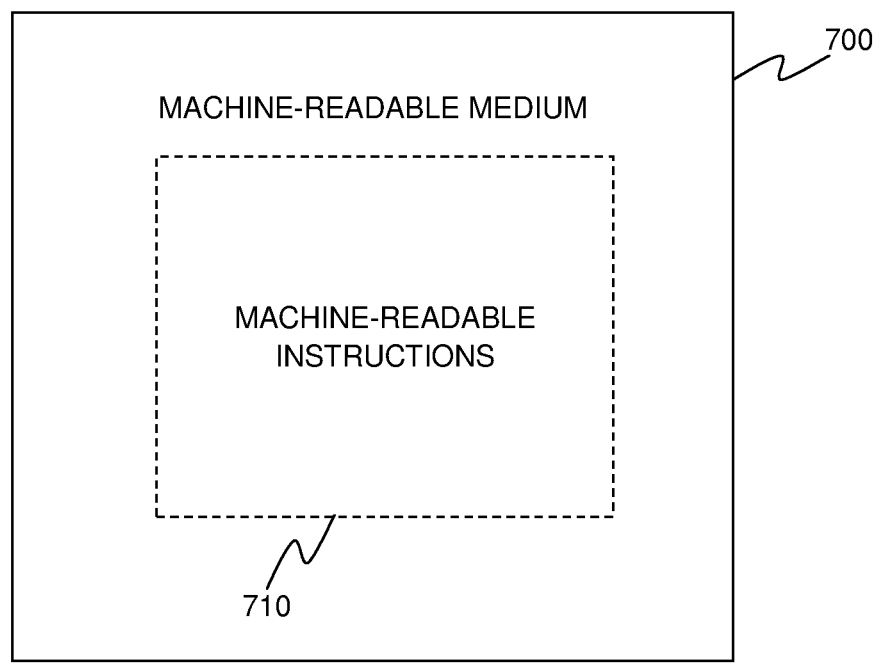
FIG. 7 is an exemplary block diagram showing a machine-readable medium encoded with machine-readable instructions as an embodiment.

The invention can also be embodied as machine-readable instructions 710 on machine-readable storage medium 700 as shown in FIG. 7. Machine-readable storage medium 700 is any data storage device that can store data, which can thereafter be read by a machine or a computer system. Illustrative examples of machine-readable storage medium 700 include hard drives, network attached storage (NAS), read-only memory, random-access memory, CDs, DVDs, USB drives, volatile and non-volatile memory, and other optical and non-optical data storage devices. Machine-readable storage medium 700 can also be distributed over a network-coupled computer system so that machine-readable instructions 710 are stored and executed in a distributed fashion. Machine-readable instructions 710 can perform any or all of the operations illustrated in FIGS. 1, 2, 4 and 5.

Figure 8:
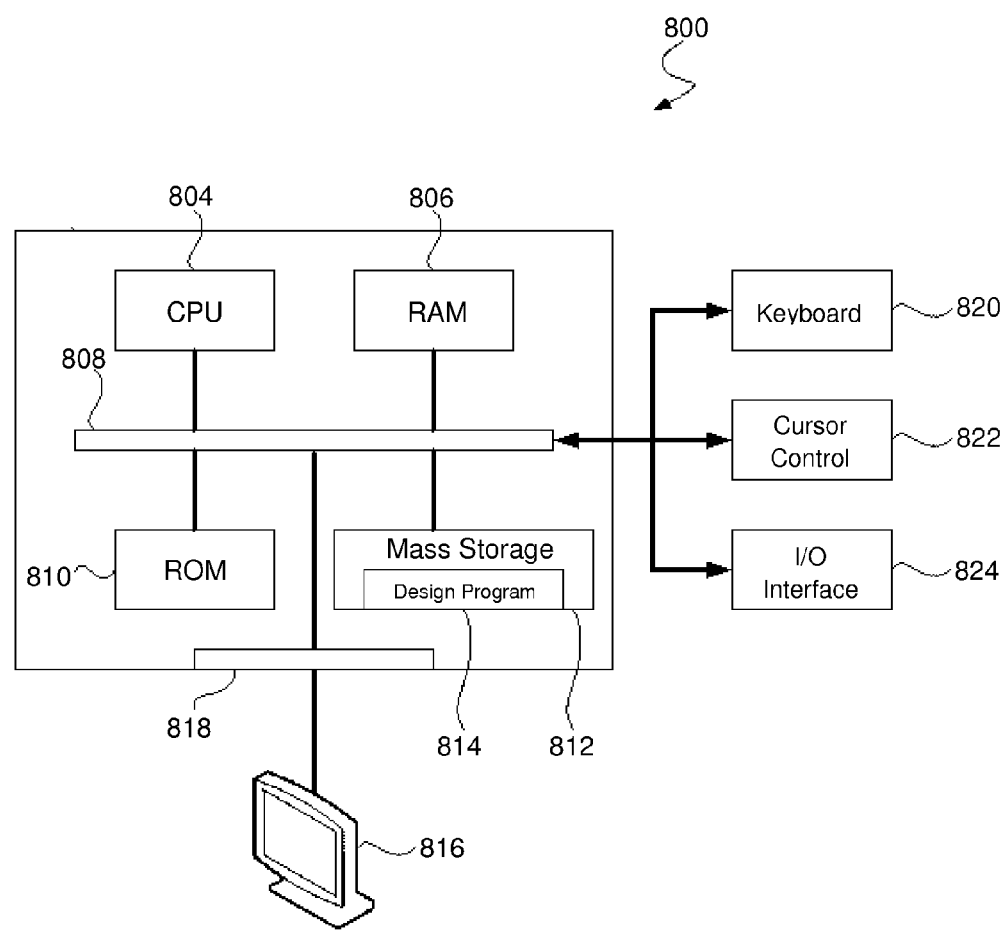
FIG. 8 is an exemplary schematic diagram of a computer system for implementing exemplary embodiments.

FIG. 8 is a simplified schematic diagram of computer system 800 for implementing the exemplary embodiments. It should be appreciated that the methods described herein may be performed with a digital processing system, such as a conventional, general-purpose computer system. Special-purpose computers, which are designed or programmed to perform one function may be used in the alternative. The computer system includes a central processing unit (CPU) 804, which is coupled through bus 808 to random access memory (RAM) 806, read-only memory (ROM) 810, and mass storage 812. Mass storage device 812 represents a persistent data storage device such as a floppy disc drive or a fixed disc drive, which may be local or remote.

Referring still to FIG. 8, design program 814 resides in mass storage 812, but can also reside in RAM 806 during processing. According to one embodiment, design program 814 is an EDA tool, or a module of an EDA tool, that can perform any or all of the operations illustrated in FIGS. 1, 2, 4 and 5, and additional functionality described herein. It should be appreciated that CPU 804 may be embodied in a general-purpose processor, a special-purpose processor, or a specially programmed logic device. Display 816 is in communication with CPU 804, RAM 806, ROM 810, and mass storage device 812, through bus 808 and display interface 818. Keyboard 820, cursor control 822, and interface 824 are coupled to bus 808 to communicate information in command selections to CPU 804. It should be appreciated that data to and from external devices may be communicated through interface 824.

The embodiments, thus far, were described with respect to integrated circuits. The method and apparatus described herein may be incorporated into any suitable circuit. For example, the method and apparatus may be incorporated into numerous types of devices such as microprocessors or programmable logic devices. Exemplary programmable logic devices include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of storing design information in an integrated circuit (IC) comprising:
generating a plurality of status information related to an IC design, wherein the IC design is obtained from a compilation of a design file, wherein the compilation includes a plurality of analysis operations, and wherein the plurality of status information is generated based on the plurality of analysis operations;
encoding the plurality of status information;
generating a configuration file based on the compiled IC design, wherein the configuration file comprises the encoded plurality of status information; and
configuring the IC with the configuration file, wherein the encoded plurality of status information is stored in the IC during the configuration of the IC.

2. The method of claim 1, wherein the encoded plurality of status information is stored in a dedicated storage element in the IC.

3. The method of claim 1 further comprising:
accessing the encoded plurality of status information stored in the IC during runtime.

4. The method of claim 3, wherein the accessing is performed through one of a Joint Action Test Group (JTAG) interface, an input/output (I/O) pin or a plurality of communication channels on the IC.

5. The method of claim 1, wherein the plurality of status information comprises at least one of a pin assignment status, pin timing constraints status or a clock timing constraints status of the IC design.

6. The method of claim 1 further comprising:
decoding the plurality of status information during runtime.

7. The method of claim 1, wherein the plurality of status information includes a plurality of design rule violations, wherein the plurality of design rule violations is grouped according to types of design rule violations, and wherein the encoding further comprises storing a total number of each type of design rule violation as a logarithmic value.

8. A machine readable storage medium encoded with sequences of instructions for storing design information in an integrated circuit (IC), the sequences of instructions which when executed, cause a machine to perform a method comprising:
generating a plurality of status information related to an IC design, wherein the IC design is obtained from a compilation of a design file, wherein the compilation includes a plurality of analysis operations, and wherein the plurality of status information is generated based on the plurality of analysis operations;
encoding the plurality of status information;
generating a configuration file based on the compiled IC design, wherein the configuration file comprises the encoded plurality of status information; and
configuring the IC with the configuration file, wherein the encoded plurality of status information is stored in the IC during the configuration of the IC.

9. The machine readable medium of claim 8, wherein the encoded plurality of status information is stored in a dedicated storage element in the IC.

10. The machine readable medium of claim 8 further comprising:
accessing the encoded plurality of status information stored in the IC during runtime.

11. The machine readable medium of claim 10, wherein the accessing is performed through one of a Joint Action Test Group (JTAG) interface, an input/output (I/O) pin or a plurality of communication channels on the IC.

12. The machine readable medium of claim 8, wherein the plurality of status information comprises at least one of a pin assignment status, pin timing constraints status or a clock timing constraints status of the IC design.

13. The machine readable medium of claim 8 further comprising:
decoding the plurality of status information during runtime.

14. The machine readable medium of claim 8, wherein the plurality of status information includes a plurality of design rule violations, wherein the plurality of design rule violations is grouped according to types of design rule violations, and wherein the encoding further comprises storing a total number of each type of design rule violation as a logarithmic value.

15. A method of generating a configuration file for an integrated circuit (IC), comprising:
encoding a portion of a plurality of status reports, the plurality of status reports based on a compiled IC design, wherein the compiled IC design is obtained from a compilation of a design file and a plurality of constraints;
generating a configuration file based on the compiled IC design, wherein the configuration file includes the encoded portion of the plurality of status reports; and
configuring the IC with the generated configuration file wherein the encoded status reports are recorded in memory of the IC, and wherein at least one method operation is executed by a processor.

16. The method of claim 15 further comprising:
accessing the encoded portion of the plurality of status information stored in the IC during runtime.

17. The method of claim 16, wherein the accessing is performed through one of a Joint Action Test Group (JTAG) interface, an input/output (I/O) pin or a plurality of communication channels on the IC.

18. The method of claim 15, wherein the plurality of status information comprises at least one of a pin assignment status, pin timing constraints status or a clock timing constraints status of the IC design.

19. The method of claim 15 further comprising:
decoding the plurality of status information during runtime.

20. The method of claim 15, wherein the plurality of status reports includes a plurality of design rule violations, wherein the plurality of design rule violations is grouped according to types of design rule violations, and wherein the encoding further comprises storing a total number of each type of design rule violation as a logarithmic value.

* * * * *